(12) United States Patent
Wolman et al.

(10) Patent No.: US 9,264,749 B2
(45) Date of Patent: Feb. 16, 2016

(54) SERVER GPU ASSISTANCE FOR MOBILE GPU APPLICATIONS

(71) Applicant: Microsoft Corporation, Redmond, WA (US)

(72) Inventors: Alastair Wolman, Seattle, WA (US); Eduardo Alberto Cuervo Laffaye, San Francisco, CA (US); Stefan Saroiu, Redmond, WA (US); Madanlal Musuvathi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/714,379

(22) Filed: Dec. 13, 2012

(65) Prior Publication Data

US 2014/0173674 A1 Jun. 19, 2014

(51) Int. Cl.
*H04N 7/173* (2011.01)
*H04N 21/25* (2011.01)
*H04N 21/2343* (2011.01)
(Continued)

(52) U.S. Cl.
CPC ....... *H04N 21/25* (2013.01); *H04N 21/234327* (2013.01); *H04N 21/2662* (2013.01); *H04N 21/41407* (2013.01); *H04N 21/42653* (2013.01); *H04N 21/6131* (2013.01); *H04N 21/6181* (2013.01); *H04N 21/6379* (2013.01); *H04N 21/8451* (2013.01)

(58) Field of Classification Search
CPC .............. H04N 21/25; H04N 21/6131; H04N 21/2662; H04N 21/41407; H04N 21/234327; H04N 21/6181; H04N 21/8451; H04N 21/6379; H04N 21/42653

USPC ......................................................... 725/116
See application file for complete search history.

(56) References Cited

U.S. PATENT DOCUMENTS 6,148,005 A * 11/2000 Paul et al. ..................... 370/469
6,233,283 B1 * 5/2001 Chiu et al. ............... 375/240.27
(Continued)

OTHER PUBLICATIONS

Huang, et al., "Interactive Illustrative Rendering on Mobile Devices", Retrieved at <<https://engineering.purdue.edu/purpl/level2/papers/CGNA2007_huang.pdf>>, IEEE Computer Graphics and Applications, May 2007, pp. 1-7.

(Continued)

*Primary Examiner* — Nasser Goodarzi
*Assistant Examiner* — Michael B Pierorazio
(74) *Attorney, Agent, or Firm* — Alin Corie; Sandy Swain; Micky Minhas

(57) ABSTRACT

Various technologies described herein pertain to performing collaborative rendering. A GPU of a mobile device can generate a mobile-rendered video stream based on a first instance of an application executed on the mobile device. A GPU of a server can generate one or more server-rendered video streams based on instance(s) of the application executed on the server. Based on the one or more server-rendered video streams, the server can generate a compressed server-manipulated video stream. The mobile device can further combine the mobile-rendered video stream and the compressed server-manipulated video stream to form a collaborative video stream, and a display screen of the mobile device can be caused to display the collaborative video stream. The mobile-rendered video stream can have a first level of a quality attribute and the collaborative video stream can have a second level of the quality attribute greater than the first level of the quality attribute.

20 Claims, 8 Drawing Sheets

(51) Int. Cl.
*H04N 21/2662* (2011.01)
*H04N 21/414* (2011.01)
*H04N 21/426* (2011.01)
*H04N 21/61* (2011.01)
*H04N 21/6379* (2011.01)
*H04N 21/845* (2011.01)

(56) References Cited

U.S. PATENT DOCUMENTS

| | | | |
|---|---|---|---|
| 7,432,932 B2* | 10/2008 | San et al. ................ 345/501 |
| 7,522,167 B1 | 4/2009 | Diard et al. |
| 7,684,752 B2 | 3/2010 | Perlman |
| 7,849,491 B2* | 12/2010 | Perlman ................ 725/133 |
| 8,147,339 B1* | 4/2012 | Perry ................ 463/42 |
| 8,396,122 B1* | 3/2013 | Taylor ................ 375/240.12 |
| 8,500,558 B2* | 8/2013 | Smith ................ 463/42 |
| 8,537,899 B1* | 9/2013 | Taylor ................ 375/240.2 |
| 2004/0261113 A1* | 12/2004 | Paul et al. ................ 725/90 |
| 2007/0094700 A1 | 4/2007 | Wolfe |
| 2009/0119736 A1* | 5/2009 | Perlman et al. ................ 725/133 |
| 2009/0125961 A1* | 5/2009 | Perlman et al. ................ 725/112 |
| 2009/0125967 A1* | 5/2009 | Perlman et al. ................ 725/133 |
| 2009/0144448 A1* | 6/2009 | Smith ................ 709/246 |
| 2010/0007582 A1* | 1/2010 | Zalewski ................ 345/8 |
| 2010/0134505 A1 | 6/2010 | Andersen |
| 2010/0167809 A1* | 7/2010 | Perlman et al. ................ 463/24 |
| 2010/0273553 A1* | 10/2010 | Zalewski ................ 463/31 |
| 2010/0285879 A1* | 11/2010 | Huang et al. ................ 463/36 |
| 2010/0285883 A1* | 11/2010 | Zalewski ................ 463/36 |
| 2010/0304868 A1* | 12/2010 | Zalewski ................ 463/38 |
| 2010/0306402 A1* | 12/2010 | Russell et al. ................ 709/231 |
| 2011/0086706 A1* | 4/2011 | Zalewski ................ 463/36 |
| 2011/0092291 A1* | 4/2011 | Perlman ................ 463/40 |
| 2011/0118032 A1* | 5/2011 | Zalewski ................ 463/39 |
| 2011/0124410 A1* | 5/2011 | Mao et al. ................ 463/31 |
| 2011/0195782 A1* | 8/2011 | Mao et al. ................ 463/37 |
| 2011/0216002 A1* | 9/2011 | Weising et al. ................ 345/158 |
| 2011/0216060 A1* | 9/2011 | Weising et al. ................ 345/419 |
| 2011/0260830 A1* | 10/2011 | Weising ................ 340/5.52 |
| 2011/0304713 A1* | 12/2011 | Tardif et al. ................ 348/54 |
| 2012/0258800 A1* | 10/2012 | Mikhailov ................ 463/37 |
| 2012/0306907 A1* | 12/2012 | Huston ................ 345/619 |
| 2012/0327113 A1* | 12/2012 | Huston ................ 345/632 |
| 2012/0331058 A1* | 12/2012 | Huston et al. ................ 709/204 |
| 2013/0038618 A1* | 2/2013 | Urbach ................ 345/522 |
| 2013/0072301 A1* | 3/2013 | Mallinson ................ 463/36 |
| 2013/0106855 A1* | 5/2013 | Urbach ................ 345/424 |
| 2013/0132510 A1* | 5/2013 | Ye et al. ................ 709/217 |
| 2013/0178293 A1* | 7/2013 | Nakayama et al. ................ 463/38 |
| 2013/0212162 A1* | 8/2013 | Somadder ................ 709/203 |
| 2013/0260896 A1* | 10/2013 | Miura et al. ................ 463/42 |
| 2013/0268573 A1* | 10/2013 | Lee ................ 709/201 |
| 2013/0296052 A1* | 11/2013 | Smith ................ 463/31 |

OTHER PUBLICATIONS

Tizon, et al., "ROI Based Video Streaming for 3D Remote Rendering", Retrieved at <<http://ieeexplore.ieee.org/stamp/stamp.jsp?tp=&arnumber=6093837>>, IEEE 13th International Workshop on Multimedia Signal Processing, Oct. 17, 2011, pp. 1-6.

Pajak, et al., "Scalable Remote Rendering with Depth and Motion-flow Augmented Streaming", Retrieved at <<http://www.mpi-inf.mpg.de/~rherzog/render2videostream/render2videostreamEG2011.pdf>>, Eurographics, vol. 30 (2011), No. 2, Mar. 2011, pp. 1-10.

Lietsch, et al., "A CUDA-Supported Approach to Remote Rendering", Retrieved at <<http://ldc.usb.ve/~vtheok/cursos/ci6323/pdf/lecturas/A%20CUDA-Supported%20Approach%20to%20Remote%20Rendering%20.pdf>>, 3rd International Conference on Advances in Visual Computing, Part I, Nov. 26, 2007, pp. 724-733.

Cheng, et al., "Using Mobile GPU for General-Purpose Computing—A Case Study of Face Recognition on Smartphones", Retrieved at <<http://lbmedia.ece.ucsb.edu/resources/ref/vlsidat11.pdf>>, International Symposium on VLSI Design, Automation and Test, Apr. 25, 2011, pp. 1-4.

Yoo, et al., "Real-Time Parallel Remote Rendering for Mobile Devices using Graphics Processing Units", Retrieved at http://web.engr.illinois.edu/~shushi2/paper/icme10.pdf>>, IEEE International Conference on Multimedia and Expo>>, Jul. 19, 2010, pp. 902-907.

Mann, et al., "Selective Pixel Transmission for Navigating in Remote Virtual Environments", Computer Graphics Forum, Eurographics, vol. 16, No. 3, 1997, pp. 1-6.

Levoy, Marc, "Polygon-Assisted JPEG and MPEG Compression of Synthetic Images", Proceedings of SIGGRAPH, 1995, pp. 21-28.

Flinn, et al., "Can Deterministic Replay be an Enabling Tool for Mobile Computing?", In HotMobile, 2011, pp. 84-89.

Cuervo, et al., "MAUI: Making Smartphones Last Longer with Code Offload", Proceedings of the 8th International Conference on Mobile Systems, Applications, and Services, Jun. 15, 2010, pp. 1-14.

Chun, et al., "CloneCloud: Elastic Execution between Mobile Device and Cloud", Eurosys, Apr. 10, 2011, pp. 1-14.

* cited by examiner

SERVER GPU ASSISTANCE FOR MOBILE GPU APPLICATIONS

BACKGROUND

With the advent of consumer mobile devices equipped with high-resolution touchscreens, powerful processors, and graphics processing units (GPUs), electronic gaming has become a popular activity on mobile devices such as smartphones, tablets, and the like. Many users employ mobile devices to play electronic games, with at least some of such users commonly spending substantial amounts of time playing the electronic games. As device screens become larger and screen resolutions increase for mobile devices, finer graphical detail and advanced graphical effects are becoming more common for mobile applications, such as the electronic games, etc.

To provide richer visual experiences, processing capabilities of GPUs of mobile devices have improved; however, the GPUs of mobile devices typically cannot duplicate sophisticated graphical detail provided by gaming consoles and high-end desktop GPUs. A reason for such difference in performance is power consumption. According to an example, a high-end desktop GPU may consume 500 W of power, whereas a high-end mobile GPU may consume less than 10 W of power. Moreover, mobile GPUs likely will continue to lag behind desktop GPUs since battery capacity of the mobile devices is limited, and high power consumption may lead to sophisticated and bulky thermal dissipation mechanisms, which may be incompatible with mobile form factors.

A conventional approach attempts to close the performance and energy gaps between mobile devices and server-side infrastructure through remote execution and code offload. Such approach typically utilizes general-purpose workloads running on central processing units (CPUs) of the mobile devices.

Another conventional approach to enable high-end gaming on resource-constrained mobile devices is based on a thin-client architecture, in which the execution of game logic and the rendering process is performed remotely on a server with a powerful CPU and GPU. For instance, the mobile devices can take advantage of server-side infrastructure equipped with high-end CPUs and GPUs by transmitting user input to remote servers, and receiving the resulting audio-visual output encoded as compressed video. However, transmitting game content that meets expectations of gamers with regards to screen resolution, video quality, and frame rate can result in high bandwidth utilization. For this reason, such a conventional thin-client approach may not work in bandwidth scarce environments, such as cafés or airports, or under limited cellular data plans. Moreover, the thin-client approach typically requires the mobile device to be connected to the rendering server when playing a game; thus, offline gaming would be unavailable when employing such an approach.

Another common approach is to adapt high-end games to constraints imposed by mobile device hardware specifications. However, adapting games to such constraints oftentimes results in a lack of graphical details, such as complex lighting, shadows, particles, fog, detailed textures, complex models, non-critical graphical objects such as blades of grass in the field, and the like. This approach is oftentimes employed in modern games to allow such games to run on underpowered hardware, such as low-end desktops and laptops. Thus, through custom graphics settings, different levels of visual detail and effects can be enabled or disabled (e.g., using a configuration screen, etc.) in order to obtain a sufficient level of detail while allowing the game to be rendered at a full frame rate.

SUMMARY

Described herein are various technologies that pertain to performing collaborative rendering. A graphics processing unit (GPU) of a mobile device can generate a mobile-rendered video stream based on a first instance of an application executed on the mobile device. A GPU of a server can generate one or more server-rendered video streams based on instance(s) of the application executed on the server, where the instance(s) of the application executed on the server are synchronized with the first instance of the application executed on the mobile device. Based on the one or more server-rendered video streams, the server can generate a compressed server-manipulated video stream. The mobile device can further combine the mobile-rendered video stream and the compressed server-manipulated video stream to form a collaborative video stream, and a display screen of the mobile device can be caused to display the collaborative video stream. The mobile-rendered video stream can have a first level of a quality attribute and the collaborative video stream can have a differing second level of the quality attribute, where the second level of the quality attribute is greater than the first level of the quality attribute.

According to various embodiments, video for display on a display screen of a mobile device can be collaboratively rendered. The first instance of an application can be executed on the mobile device, which can cause the GPU of the mobile device to generate the mobile-rendered video stream. Moreover, the compressed server-manipulated video stream generated based at least in part upon a second instance of the application executed by the server can be received from the server. The mobile-rendered video stream and the compressed server-manipulated video stream can be combined to form the collaborative video stream, and the display screen of the mobile device can be caused to display the collaborative video stream.

In accordance with various embodiments, the GPU of the server can be employed to assist video rendering on the mobile device. Application data can be received by the server from the mobile device, where the application data pertains to the first instance of the application executed on the mobile device. Moreover, one or more instances of the application can be executed on the server based on the application data received from the mobile device, which can cause the GPU (or more than one GPU) of a server to generate the one or more server-rendered video streams. The one or more instances of the application executed on the server can be based on the application data received from the mobile device. Further, an amount of information in the one or more server-rendered video streams can be reduced to generate the compressed server-manipulated video stream, which can be transmitted to the mobile device. Thus, while one or more server-rendered video stream can be generated by the GPU of the server, one compressed server-manipulated video stream can be transmitted from the server to the mobile device.

Various exemplary collaborative rendering techniques are set forth herein. According to an example, the mobile device can render each frame at a reduced level of detail and the server can send a stream of differences (e.g., between a high detail version and a low detail version) to transform each of the frames rendered by the mobile device into a high detail version; such technique can be referred to as delta encoding. By way of another example, the mobile device can render a subset of the frames and the server can provide the missing frames; this technique can be referred to as client-side I-frame rendering. In accordance with yet another example, a combination of delta encoding and client-side I-frame rendering can be implemented.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
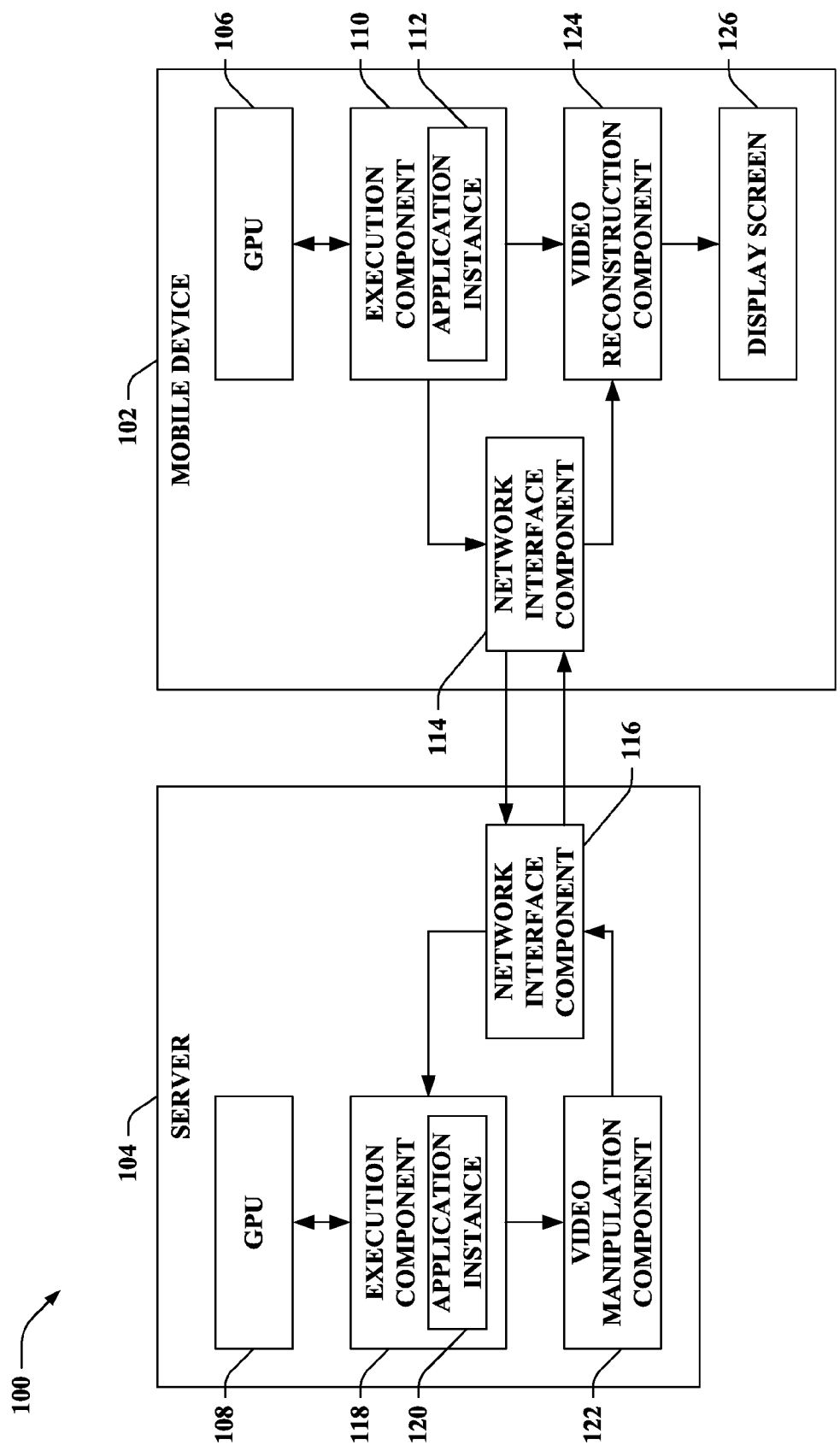
FIG. 1 illustrates a functional block diagram of an exemplary system that employs GPU offloading.

Various technologies pertaining to employing collaborative rendering, where a server GPU assists a GPU of a mobile device to render a video stream on a display screen of the mobile device, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a mobile device, such as a tablet, smartphone, handheld game console, or the like, can perform GPU rendering by offloading a portion of the GPU computation to a server-side GPU. Such rendering can be referred to as collaborative rendering. Various exemplary collaborative rendering techniques are set forth herein. According to an example, the mobile device can render each frame at a reduced level of detail and the server can send a stream of differences (e.g., between a high detail version and the low detail version) to transform each of the frames rendered by the mobile device into a high detail version; such technique can be referred to as delta encoding. By way of another example, the mobile device can render a subset of frames (I-frames) and the server can provide missing frames (P-frames); this technique can be referred to as client-side I-frame rendering. In accordance with yet another example, a combination of delta encoding and client-side I-frame rendering can be implemented.

The techniques described herein can enable the mobile device to perform high-end GPU rendering by offloading a portion of the GPU computation to server-side infrastructure. In contrast, with conventional thin-client approaches that utilize the server-side GPU to render the entire content, the techniques set forth herein utilize collaborative rendering. Thus, output of a GPU of the mobile device and a GPU of the server can be combined into the collaborative video stream for display on a display screen of the mobile device. Accordingly, the collaborative rendering techniques described herein can reduce the amount of network bandwidth used for communication between the mobile device and the server to achieve a certain visual quality, or can achieve a higher visual quality for the same amount of network bandwidth. Moreover, the collaborative rendering techniques set forth herein can support disconnected operation. Thus, even though the visual quality may be reduced when the mobile device is disconnected from the server, a user can continue to employ the application when offline.

Referring now to the drawings, FIG. 1 illustrates a system 100 that employs GPU offloading. The system 100 includes a mobile device 102 and a server 104. The mobile device 102 is a handheld computing device. Examples of the mobile device 102 include a tablet, a smartphone, a handheld game console, or the like.

The mobile device 102 includes a graphics processing unit (GPU) 106, and the server 104 includes a GPU 108. Although not shown, it is contemplated that the server 104 can include substantially any number of GPUs, which can each be substantially similar to the GPU 108. Additionally or alternatively, the mobile device 102 can include substantially any number of GPUs, which can each be substantially similar to the GPU 106.

The system 100 can perform collaborative rendering, where the GPU 108 of the server 104 can assist video rendering on the mobile device 102. Collaborative rendering can rely on the GPU 106 of the mobile device 102 to generate a mobile-rendered video stream, where the mobile-rendered video stream has a first level of a quality attribute. Further, as part of the collaborative rendering implemented by the system 100, the server 104 can generate a compressed server-manipulated video stream, which can be transmitted to the mobile device 102. The mobile device 102 can receive the compressed server-manipulated video stream from the server 104. Moreover, the mobile device 102 can combine the compressed server-manipulated video stream with the mobile-rendered video stream to generate a collaborative video stream, where the collaborative video stream has a second level of the quality attribute. Further, the second level of the quality attribute is greater than the first level of the quality attribute. Examples of the quality attribute include frame rate, visual detail defined by a set of enabled visual effects, a combination thereof, and the like. Thus, the second level of the frame rate is greater than the first level of the frame rate, the second level of the visual detail is greater than the first level of the visual detail, and so forth.

The quality attribute of a video stream can also be referred to herein as fidelity. Accordingly, as used herein, a video stream that has the first level of the quality attribute can be referred to as a low fidelity video stream, and a video stream that has the second level of the quality attribute can be referred to as a high fidelity video stream. In accordance with an example where the quality attribute is visual detail, a video stream that has the first level of the quality attribute can be referred to as a low detail version (e.g., a low detail frame can be included in the video stream that has the first level of the quality attribute), and a video stream that has the second level of the quality attribute can be referred to as a high detail version (e.g., a high detail frame can be included in the video stream that has the second level of the quality attribute).

The mobile device 102 includes an execution component 110 that executes a first instance 112 of an application on the mobile device 102. The execution component 110 can cause the GPU 106 of the mobile device 102 to generate the mobile-rendered video stream based on the first instance 112 of the application executed by the mobile device 102. As noted above, the mobile-rendered video stream can have the first level of the quality attribute.

The application can be an electronic game. Many of the examples set forth herein pertain to the application being an electronic game. However, it is to be appreciated that other types of applications are intended to fall within the scope of the hereto appended claims, and thus, the examples set forth herein can be extended to other types of applications.

The mobile device 102 can further include a network interface component 114 that transmits application data that pertains to the execution of the first instance 112 of the application to the server 104. The application data, for example, can include user input, data from a replay log that can be used to synchronize the execution of server application instances (e.g., the first instance 112 of the application and/or disparate instance(s) of the application executed on the server), etc.; however, the claimed subject matter is not so limited.

The server 104 includes a network interface component 116 that receives the application data from the mobile device 102 (e.g., from the network interface component 114 of the mobile device 102). Moreover, the server 104 includes an execution component 118 that executes a second instance 120 of the application on the server 104 based on the application data received from the mobile device 102. The execution component 118 can further cause the GPU 108 of the server 104 to generate a server-rendered video stream (e.g., a first server-rendered video stream) based on the second instance 120 of the application.

Although not shown, in various embodiments, the server 104 can include a second execution component (e.g., in addition to the execution component 118) that can execute a third instance of the application on the server 104 based upon the application data received from the mobile device 102. In accordance with such embodiments, the second execution component can cause the GPU 108 of the server 104 (and/or a disparate GPU of the server (not shown)) to generate a second server-rendered video stream. Yet, it is to be appreciated that the claimed subject matter is not so limited.

The server 104 further includes a video manipulation component 122 that reduces an amount of information in the server-rendered video stream(s) to generate a compressed server-manipulated video stream. Moreover, the network interface component 116 of the server 104 can transmit the compressed server-manipulated video stream to the mobile device 102.

The network interface component 114 of the mobile device 102 can receive the compressed server-manipulated video stream from the server 104. The mobile device 102 further includes a video reconstruction component 124 that can combine the mobile-rendered video stream (e.g., rendered responsive to execution of the first instance 112 of the application by the execution component 110 of the mobile device 102) and the compressed server-manipulated video stream (e.g., based on at least the server-rendered video stream which is rendered responsive to execution of the second instance 120 of the application by the execution component 118 of the server 104) to form the collaborative video stream. Again, as set forth above, the collaborative video stream can have the second level of the quality attribute, where the second level of the quality attribute is greater than the first level of the quality attribute.

The mobile device 102 can further include a display screen 126. For example, the display screen 126 can be a touchscreen. The video reconstruction component 124 can cause the display screen 126 of the mobile device 102 to display the collaborative video stream. Although not shown herein, it is contemplated that the display screen 126 can additionally or alternatively be external to the mobile device 102.

Fine-grained details can be expensive for the GPU 106 of the mobile device 102 to render at an acceptable frame rate. The fine-grained details can represent a small portion of the total information within a video stream. Thus, collaborative rendering implemented by the system 100 can rely on the GPU 106 of the mobile device 102 rendering the mobile-rendered video stream, which has the first level of the quality attribute. The mobile-rendered video stream can include a first portion of the content of the video stream (e.g., the collaborative video stream). Further, collaborative rendering can rely on the server infrastructure to provide additional details, which can be combined with the mobile-rendered video stream. By way of example, the mobile-rendered video stream can be a low fidelity video stream. Following this example, when the video reconstruction component 124 combines the mobile-rendered video stream with the compressed server-manipulated video stream received from the server 104 to form the collaborative video stream, a high fidelity video stream can be generated for display on the display screen 126 of the mobile device 102.

To enable collaborative rendering, the system 100 can synchronize execution of the first instance 112 of the application on the mobile device 102 and the second instance 120 of the application on the server 104 (as well as a third instance of the application executing on the server 104, if executed). The application data sent by the mobile device 102 to the server 104, for example, can be employed to synchronize execution of the first instance 112 of the application by the execution component 110 of the mobile device 102 with execution of at least the second instance 120 of the application by the execution component 118 of the server 104. According to an example where two instances of the application are executed by the server 104, execution of the first instance 112 of the application by the mobile device 102 can be synchronized with execution of the two instances of the application by the server 104 based on the application data sent by the mobile device 102 to the server 104.

Frame-by-frame synchronization can be provided in the system 100. Since multiple instances of the application are executed, rendered objects are desirably in matching positions within corresponding frames of the mobile-rendered video stream and the server-rendered video stream (as well as the second server-rendered video stream, if rendered). Yet, it is also contemplated that an object rendered in the server-rendered video stream may be excluded from the mobile-rendered video stream (and the second server-rendered video stream, if rendered) (e.g., a low fidelity video stream may exclude such object).

The system 100 supports offline execution of the first instance 112 of the application. When the mobile device 102 is disconnected from the server 104, the mobile device 102 can support execution of the first instance 112 of the application offline to generate a video stream for display on the display screen 126, albeit with reduced visual quality. For example, the mobile-rendered video stream generated by the execution component 110 can be displayed on the display screen 126 of the mobile device 102 when the mobile device 102 is disconnected from the server 104 (e.g., the video reconstruction component 124 need not be employed when disconnected). Moreover, when the mobile device 102 is connected to the server 104, the high quality video stream can be displayed on the display screen 126. Additionally, collaborative rendering can provide network bandwidth savings relative to conventional thin-client approaches.

The system 100 can employ various types of collaborative rendering techniques. Such collaborative rendering techniques can target different aspects of fidelity of a video stream (e.g., the quality attribute), such as per frame detail or frame rate. An exemplary collaborative rendering technique that can be employed by the system 100 is referred to as delta encoding. With delta encoding, the mobile device 102 produces a low fidelity video stream by generating frames in the mobile-rendered video stream at a lower level of detail. Thus, the execution component 110 can cause the GPU 106 of the mobile device 102 to generate the mobile-rendered video stream, which can have the lower level of detail (e.g., the first level of the quality attribute). The server-side GPU 108 can concurrently render two versions of the output of execution of two instances of the application, namely, a high fidelity video stream (e.g., the first server-rendered video stream) and a low fidelity video stream (e.g., the second server-rendered video stream). The low fidelity video stream rendered by the GPU 108 of the server 104 and the mobile-rendered video stream can have substantially similar fidelities (e.g., the first level of the quality attribute, lower level of detail, etc.). Moreover, the video manipulation component 122 of the server 104 can use the two server-rendered video streams to calculate delta frames representing visual differences between high fidelity and low fidelity frames, which can be encoded. Further, the video reconstruction component 124 of the mobile device 102 can apply the delta frames to frames of the mobile-rendered video stream rendered locally by the GPU 106 of the mobile device 102 to form the collaborative video stream.

Another exemplary collaborative rendering technique that can be employed by the system 100 is referred to as client-side I-frame rendering. With client-side I-frame rendering, the mobile-rendered video stream generated by the GPU 106 of the mobile device 102 can be a low fidelity video stream that includes highly detailed frames at a lower frame rate. The execution component 118 of the server 104 can cause the GPU 108 to render the server-rendered video stream at a higher frame rate. The video manipulation component 122 of the server 104 can generate the compressed server-manipulated video stream from the server-rendered video stream, where the compressed server-manipulated video stream includes missing frames at a higher rate which can be sent by the network interface component 116. Accordingly, the video reconstruction component 124 of the mobile device 102 can decode the compressed server-manipulated video stream, combine the frames in an appropriate order, and cause the collaborative video stream to be displayed on the display screen 126.

Further, it is contemplated that the collaborative rendering technique employed by the system 100 can be a combination of delta encoding and client-side I-frame rendering.

Substantially any type of video compression for encoding the compressed server-manipulated video stream at the server 104 and decoding the compressed server-manipulated video stream at the mobile device 102 can be utilized. Many of the examples set forth herein describe utilization of H.264 for the video compression. For instance, the compressed server-manipulated video stream can be encoded utilizing an H.264 video encoder of the server 104. Moreover, the mobile device 102 can employ an H.264 video decoder to decode the compressed server-manipulated video stream received from the server 104. The H.264 video decoder of the mobile device 102, for example, can be a hardware accelerated H.264 video decoder built into the mobile device 102 (e.g., hardware acceleration can improve performance and energy efficiency of decoding while allowing the main CPU of the mobile device 102 to focus on executing application logic); yet, the claimed subject matter is not so limited. It is to be appreciated, however, that other types of video compression other than H.264 are intended to fall within the scope of the hereto appended claims, and the claimed subject matter is not limited to utilization of H.264 video encoding/decoding.

Video compression can be utilized to reduce an amount of bandwidth associated with transmission of the compressed server-manipulated video stream from the server 104 to the mobile device 102. Video compression can take advantage of two common characteristics of real-world videos: strong temporal and spatial locality. Temporal locality refers to similarities among contiguous frames within the same video. For example, scenes of an object in motion typically preserve many of the pixels found in previous frames with small changes in their position. Similarly, gradual changes in color or illumination preserve much of the information from the previous frame, with small changes. Spatial locality refers to similarities among contiguous sets of pixels within the same frame. Examples of spatial locality are gradual texture variations within a scene, and shading of uniformly colored objects or backgrounds. Both forms of locality can create opportunities for high compression ratios.

Video encoders can use the temporal and spatial locality characteristics of video through a prediction model. This model can reduce redundancy by predicting future frames within a sequence based on information found in previously coded frames (temporal prediction), or by predicting future images samples within a frame using previously coded samples (spatial prediction). The prediction is then subtracted from the actual data, resulting in a set of residuals that shrink as the prediction becomes more accurate.

The resulting residuals can undergo lossy compression through a process called quantization. This process offers a tradeoff at encoding time between size and quality. In general, scenes presenting strong locality can result in enhanced predictions and therefore smaller video representations for a given quantization parameter.

Compressed video can include reference frames and predictive frames. A reference frame can be referred to as an I-frame (Intra-coded frame). An I-frame is coded without referencing other frames. A P-frame (predictive frame) is coded using a temporal prediction from one (or more) reference frames that precede such P-frame. Moreover, a B-frame (bidirectional predictive frame) is a type of P-frame; a B-frame is coded with temporal prediction using reference frames displayed either before or after the B-frame. An I-frame can resemble a typically lossy compressed image, while a P-frame can be formed by a set of compressed residuals and motion vectors used to recreate the source frame. The sequence of residuals forming each frame is entropy coded and augmented with metadata that can assist the decoder in determining the encoding settings.

Further, deterministic execution of the plurality of instances of the application is supported. According to an example, the application can be an electronic game. Following this example, through deterministic execution, a high detail version (and possibly a low detail version) of the game running on the server 104 and a low detail version of the game running on the mobile device 102 render substantially similar scenes in the game based on user input at the mobile device 102. While the scene is substantially similar, the graphical output will differ due to different settings between the high detail and low detail versions.

Although not shown, it is contemplated that the mobile device 102 and the server 104 can each include a respective runtime call interceptor component that enforces determinism by intercepting non-deterministic system calls and returning deterministic results. Moreover, when run in the mobile device 102, the runtime call interceptor component can also be used to intercept system time calls (e.g., if using frame skipping to compensate for large rendering delay, then results of this call can be rendered to allow the mobile device 102 to render frames ahead of time).

Further, although not shown, it is also contemplated that the mobile device 102 and the server 104 can each include a respective graphics interceptor component that can intercept high level calls to the GPU 106 and the GPU 108, respectively. For instance, the execution component 110 can include a graphics interceptor component that can redirect the output of the GPU 106 to the video reconstruction component 106, and the execution component 118 can include a graphics interceptor component that can redirect the output of the GPU 108 to the video manipulation component 122. Moreover, the graphics interceptor components can redirect outputs from the GPU 106 and the GPU 108 to bitmap files and/or enforce consistent frame rates.

Figure 2:
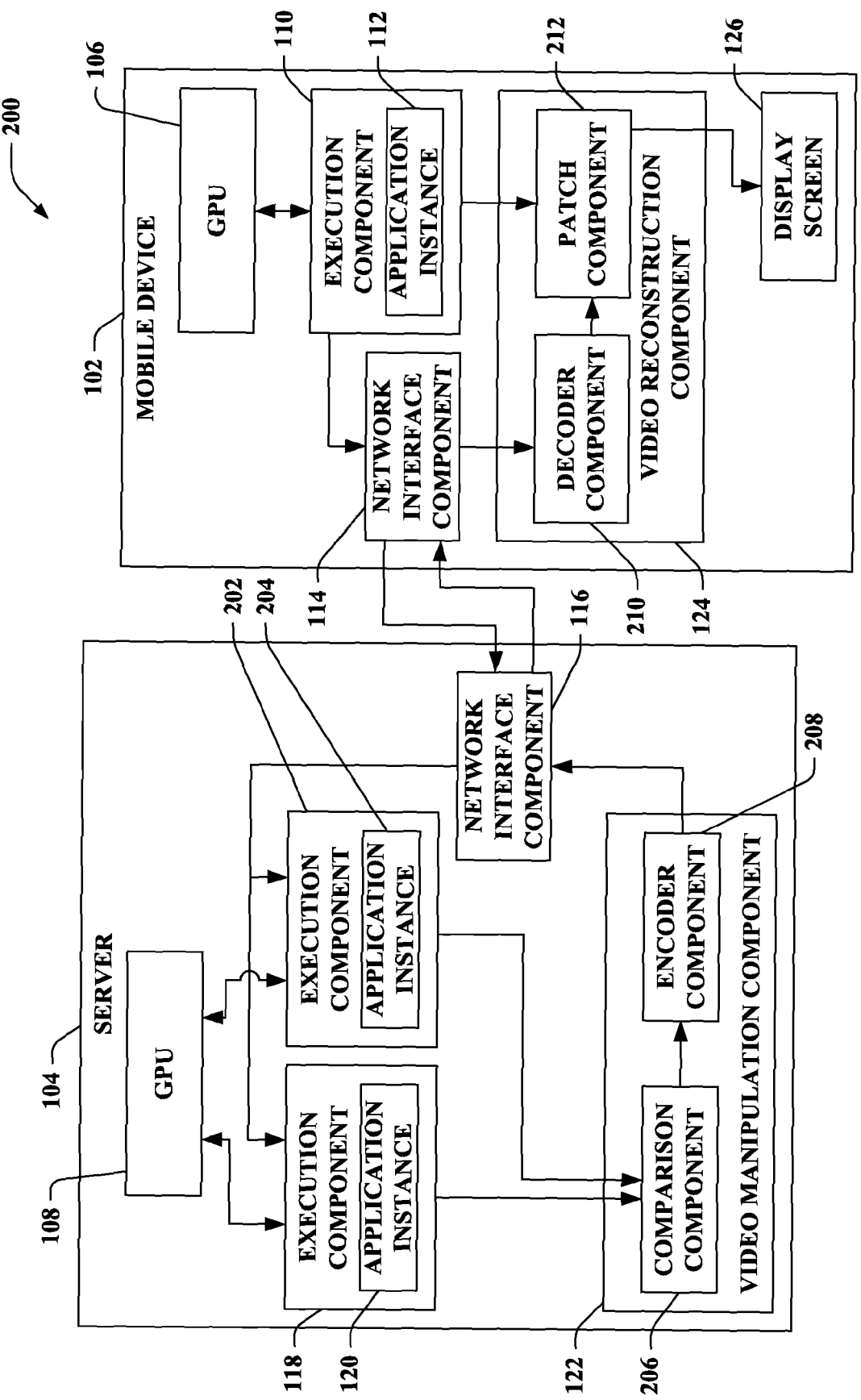
FIG. 2 illustrates a functional block diagram of an exemplary system that employs delta encoding.

With reference to FIG. 2, illustrated is a system 200 that employs delta encoding. The system 200 includes the mobile device 102 and the server 104. As described above, the mobile device 102 includes the GPU 106, the execution component 110, the network interface component 114, the video reconstruction component 124, and the display screen 126. Moreover, the server 104 includes the GPU 108, the execution component 118, the video manipulation component 122, and the network interface component 116.

In the example depicted in FIG. 2, the server 104 further includes a second execution component 202. Accordingly, the server 104 includes two execution components, namely, the execution component 118 and the execution component 202. As noted above, application data pertaining to execution of the first instance 112 of the application on the mobile device 102 can be received by the network interface component 116 of the server 104. The execution component 118 executes the second instance 120 of the application on the server 104 based upon the application data received from the mobile device 102, and the execution component 202 executes a third instance 204 of the application on the server 104 based upon the application data received from the mobile device 102.

The execution component 118 can cause the GPU 108 of the server 104 to render the first server-rendered video stream based on the second instance 120 of the application as described above. Further, the execution component 202 can cause the GPU 108 of the server 104 to render a second server-rendered video stream based on the third instance 204 of the application. The first server-rendered video stream can have the second level of the quality attribute (e.g., high fidelity video stream), and the second server-rendered video stream can have the first level of the quality attribute (e.g., low fidelity video stream). For instance, the quality attribute can be visual detail defined by a set of enabled visual effects of the application. Moreover, fewer visual effects can be enabled for the first level of the visual detail as compared to the second level of the visual detail.

The video manipulation component 122 of the server 104 can further include a comparison component 206 that can compute pixel-by-pixel differences (i.e., deltas) between corresponding frames of the first server-rendered video stream and the second server-rendered video stream to generate a sequence of delta frames. The video manipulation component 122 can also include an encoder component 208 that can encode the sequence of the delta frames to generate the compressed server-manipulated video stream. The compressed server-manipulated video stream can thereafter be transmitted by the network interface component 116 to the mobile device 102 (e.g., the network interface component 114 of the mobile device 102 can receive the compressed server-manipulated video stream).

The video reconstruction component 124 of the mobile device 102 can further include a decoder component 210 that can decode the compressed server-manipulated video stream received from the server 104 to output decoded delta frames. Moreover, the video reconstruction component 124 can include a patch component 212 that can apply the decoded delta frames to respective corresponding frames of the mobile-rendered video stream generated by the GPU 106 based on the first instance 112 of the application executed by the execution component 110 of the mobile device 102.

Thus, the compressed server-manipulated video stream received by the network interface component 114 of the mobile device 102 from the server 104 includes delta frames. Each of the delta frames represents the pixel-by-pixel difference between corresponding frames of the first server-rendered video stream (e.g., generated based on the second instance 120 of the application executed by the execution component 118 of the server 104) and the second server-rendered video stream (e.g., generated based on the third instance 204 of the application executed by the execution component 202 of the server 104). Moreover, the patch component 212 can apply the delta frames to the respective corresponding frames of the mobile-rendered video stream to form the collaborative video stream.

According to an example, the application can be an electronic game. Following this example, the server 104 can utilize game settings to render two versions of the game output: a high detail version (e.g., the first server-rendered video stream, high fidelity video stream) and a low detail version (e.g., the second server-rendered video stream, low fidelity video stream). Graphical differences between these two versions of the game output can be computed by the comparison component 206 on a pixel-by-pixel basis per frame. The differences can thereafter be compressed by the encoder component 208. Accordingly, the compressed server-manipulated video stream can be compressed differences between the high detail version and the low detail version of the game. Moreover, the mobile device 102 can render one version of the game output, namely, a low detail version (e.g., the mobile-rendered video stream).

The compressed server-manipulated video stream can be sent by the network interface component 116 of the server 104 to the mobile device 102. Accordingly, the network interface component 114 of the mobile device 102 can receive the compressed server-manipulated video stream. Moreover, the decoder component 210 can decode the compressed server-manipulated video stream to output decoded delta frames. The patch component 212 can apply each of the decoded delta frames as a patch to corresponding low detail frames of the mobile-rendered video stream generated by the GPU 106 of the mobile device 102. Accordingly, the collaborative video stream can be generated. The collaborative video stream can have a similar level of detail as compared to the high fidelity video stream (e.g., the first server-rendered video stream, the high detail version) rendered by the execution component 118 of the server 104 (e.g., the collaborative video stream and the first server-rendered video stream can both have the second level of the quality attribute).

To support delta encoding, the game provides configuration settings that allow the mobile device 102 to render the low detail version of the game at an acceptable frame rate. According to an example, 30 frames per second can be a minimum acceptable frame rate and 60 frames per second can be a maximum acceptable frame rate. Moreover, the compressed server-manipulated video stream received from the server 104, which includes the delta frames, can be smaller than a compressed video stream of the high detail version of the game. The size of the difference can represent bandwidth savings associated with delta encoding over standard thin-client gaming.

Delta encoding relies on adjusting the settings of the electronic game to produce both high detail and low detail versions of graphics output of the game. The high detail version includes a set of the visual effects of the game at a maximum level of detail (or a high level of detail). The low detail version enables a subset of those settings, which allows the GPU 106 of the mobile device 102 to reach the acceptable frame rate (e.g., between 30 and 60 frames per second).

Many modern games are built around a game engine. A game engine can provide a form of code reuse in game development—using a game engine can simplify the task of rapid game development. Game engines typically separate game content such as artwork, levels, characters, and weapons, from the core functionality of the game execution such as rendering, physics, sound, and input. According to an example, the system 200 (or any other system described herein) can be built into a game engine; yet, the claimed subject matter is not so limited.

To implement delta encoding, both high fidelity and low fidelity versions of the game output are produced. Electronic games commonly provide a number of game settings that can be used to control both the performance and the visual quality of the rendered graphics. For instance, game designers can expose these settings. Game settings can be used to control a variety of graphical details within the game, including lighting, shadows, fog, texture compression, bump mapping, anti-aliasing, anisotropic filtering, and complexity of the 3D models given to the rendering pipeline.

Various examples set forth below pertain to the system 200 utilizing H.264 compression. Thus, the encoder component 208 can be an H.264 encoder, and the decoder component 210 can be an H.264 decoder. It is to be appreciated, however, that other types of video compression in addition to or instead of H.264 are intended to fall within the scope of the hereto appended claims.

Delta frames computed by the comparison component 206, for example, can be encoded by the encoder component 208 using H.264 compression. Delta encoding can enable the server 104 to send less information to the mobile device 102 compared to the thin-client approach of encoding a high detail version of the game output using H.264. In a common scenario, the bandwidth savings of delta encoding can be significant, although there may be circumstances in which delta encoding can generate more traffic than the thin-client approach.

H.264 is a lossy compression scheme designed to provide high compression ratios for video. Delta frames can exhibit strong temporal locality similar to the original video frames. Accordingly, motion compensation can enable H.264 to achieve high compression ratios when compressing delta frames.

As noted above, H.264 provides lossy compression. H.264 is designed so that lost information is difficult for the human eye to perceive. The information loss is a result of a transformation and quantization process (e.g., performed by the encoder component 208), where individual pixel values that define a video signal of each frame are rounded to improve compression ratios. Such losses can impact transmitting a video of delta frames as implemented in the system 200. For instance, quantization of the delta values can introduce visible visual artifacts when the delta is patched into the low detail frames by the patch component 212 on the mobile device 102. Moreover, the encoded delta does not provide a pixel-exact representation of a difference between a high detail and low detail frame.

The challenge of visual artifacts can be due to the extended value range that deltas encode. For each pixel, the delta can represent a difference between the high detail value and the low detail value. The difference can be positive or negative, which can lead to using an extra bit to encode sign information. Without quantization, modular arithmetic can be utilized as a workaround. Consider an example for a pixel comparison that can be performed: if a maximum channel value is 255, a high detail value is 10, and a low detail value is 253, then a delta value can either be −243 or +12.

However, quantization on the deltas can introduce a problem. Consider another example: suppose the high detail value is 2 and the low detail value is 253, so that the delta value is 4 with modular arithmetic. Assume that during quantization, the delta value is rounded from 4 to 2. When applying the patch (e.g., via the patch component 212), the low detail value (253) plus the delta value (2) is 255. Accordingly, this means that the high detail value reconstructed at the mobile device 102 is now 255. With quantization of the delta, a dark pixel value has been converted to a bright pixel value, which creates a visible artifact.

Figure 3:
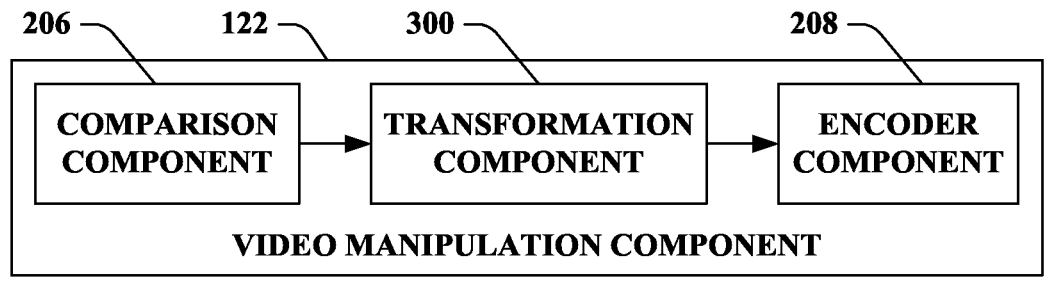
FIG. 3 illustrates a functional block diagram of a video manipulation component of the exemplary system shown in FIG. 2 in greater detail.
Figure 4:
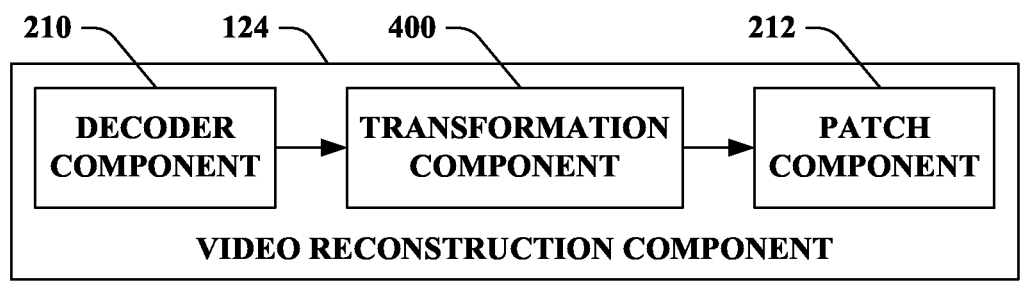
FIG. 4 illustrates a functional block diagram of a video reconstruction component of the exemplary system shown in FIG. 2 in greater detail.

FIGS. 3-4 respectively illustrate the video manipulation component 122 and the video reconstruction component 124 in greater detail. The video manipulation component 122 and the video reconstruction component 124 shown in FIGS. 3-4 can mitigate visual artifacts introduced due to quantization of delta values as described above.

More particularly, with reference to FIG. 3, the video manipulation component 122 includes the comparison component 206, a transformation component 300, and the encoder component 208. The comparison component 206 can compute the pixel-by-pixel differences between corresponding frames of the first server-rendered video stream and the second server-rendered video stream to generate the sequence of delta frames as described above. Moreover, the transformation component 300 can apply a transformation to the delta frames in the sequence. By way of example, it is contemplated that the comparison component 206 and the transformation component 300 can be combined; yet, the claimed subject matter is not so limited. The encoder component 208 can encode the sequence of the delta frames as transformed by the transformation component 300 to generate the compressed server-manipulated video stream (e.g., which can be transmitted to the mobile device 102).

According to an illustration, before invoking the encoder component 208 (e.g., the H.264 encoder), the comparison component 206 and the transformation component 300 can compute the pixel-by-pixel differences and apply a transformation as follows.

$$\Delta = \frac{Hi - Lo}{2} + 127 \quad (1)$$

As set forth above, Δ is the delta value, Hi is the high detail value (e.g., a pixel value from the first server-rendered video stream), and Lo is the low detail value (e.g., a pixel value from the second server-rendered video stream). The foregoing transformation applied by the transformation component 300 of the video manipulation component 122 can have the effect of dropping a least significant bit in favor of a sign bit.

Referring now to FIG. 4, the video reconstruction component 124 includes the decoder component 210, a transformation component 400, and the patch component 212. The decoder component 210 decodes the compressed server-manipulated video stream received from the server 104 to output decoded delta frames. Moreover, the transformation component 400 performs a transformation upon the decoded delta frames outputted by the decoder component 210. Further, the patch component 212 applies the decoded delta frames as transformed by the transformation component 400 to the respective corresponding frames of the mobile-rendered video stream to form the collaborative video stream. In accordance with an example, it is contemplated that the transformation component 400 and the patch component 212 can be combined; yet, the claimed subject matter is not so limited.

The transformation component 400 can apply the transformation before the patch component 212 applies the patch. By way of illustration, the transformation component 400 can apply the transformation and the patch component 212 can apply the patch as follows.

$$Hi = Min(2(\Delta - 127) + Lo, 255) \quad (2)$$

The foregoing can be implemented after decoding (e.g., H.264 decoding) by the decoder component 210. In equation 2, the delta value (Δ) (e.g., from the compressed server-manipulated video stream) is applied to the low detail value (Lo) (e.g., a pixel value from the mobile-rendered video stream) to determine the high detail value (Hi) (e.g., a pixel value in the collaborative video stream).

The transformations described in connection with FIGS. 3-4 can result in the loss of one bit of information in the deltas. However, this information loss can be small and comparable to the information loss that comes from quantization noise in H.264.

Again, reference is made to FIG. 2. According to another example, it is contemplated that a custom quantization process tailored for delta frames can be employed by the system 200 since the quantization mechanism in H.264 is designed for regular video sequences as opposed to sequences of delta frames. While similarities between delta and regular video frames exist, it is contemplated that a custom quantization process tailored for delta frames can be utilized. For instance, for delta frames, many pixel values encoded using the transformation described above in equation 1 can fall around 127, which can represent small differences between two sources. Because H.264 allows for custom scaling quantization matrices, this can be utilized to offset the loss of information caused by dropping the least significant bit.

Moreover, as noted above, delta encoding may have encoded deltas which may not completely represent a difference between the high detail and low detail frames due to the lossy compression. For instance, at a fixed bit rate, the information loss can be inversely proportional to the similarity of the high and low detail frames. A delta between two relatively similar frames can result in a smaller distribution of deltas, and can therefore have less quantization noise than a delta from dissimilar frames. Thus, a delta between two relatively similar frames can result in a smaller variety of values, fitting better into a target set of quantized values without losing precision. On the other hand, two considerably different frames can yield a set of values much larger than the set of quantized values, resulting in a larger loss of precision.

In order to provide enhanced quality results at lower bit rates than encoding the first server-rendered video stream (e.g., the high fidelity video stream) as is common for conventional thin-client approaches, delta encoding can rely on various assumptions. For instance, it can be assumed that there exists a low detail mode at the mobile device 102 that can render a full frame rate. Moreover, it can be assumed that there is similarity between the low detail and high detail frame sequences. Further, it can be assumed that execution of the application (e.g., the electronic game) is deterministic.

The similarity between the high detail images and the low detail images can enable achieving bandwidth savings and can mitigate quality loss. However, when large differences between frames of the first server-rendered video stream (e.g., the high fidelity video stream, high detail source, etc.) and the second server-rendered video stream (e.g., the low fidelity video stream, low detail source, etc.) are limited to certain regions, delta encoding can be used for only those regions where similarities are strong.

Figure 6:
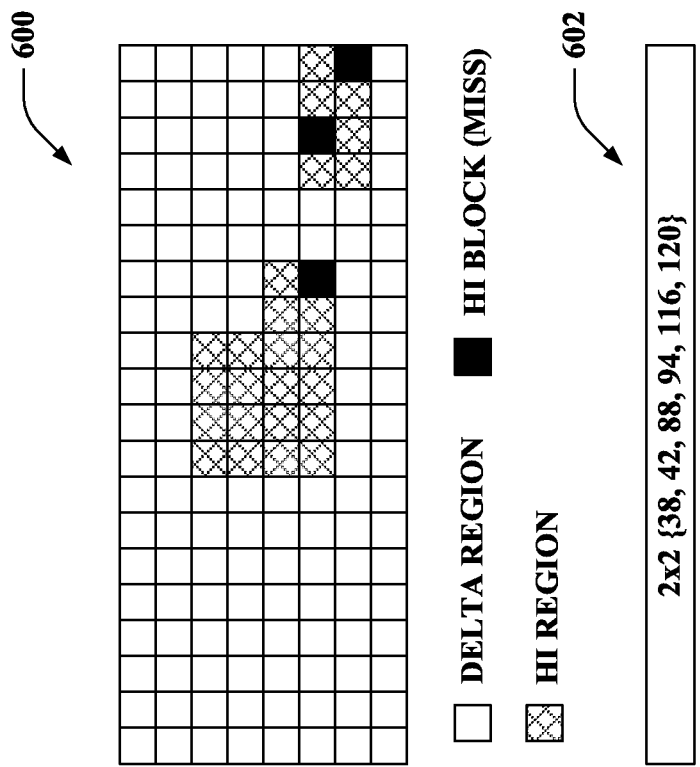
FIGS. 5-6 illustrate exemplary frames where an encoder switches between delta encoding and encoding of a high detail source for different regions.
Figure 5:
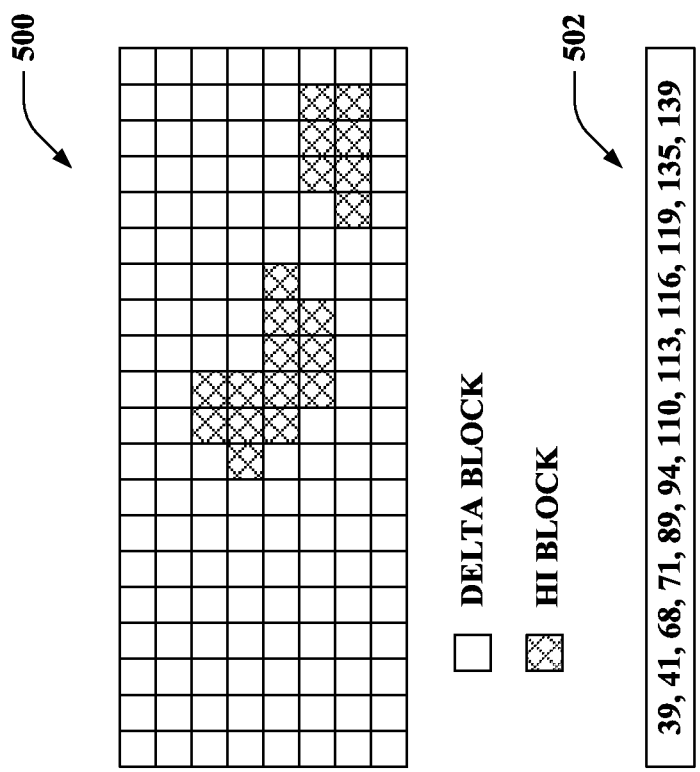

With reference to FIGS. 5-6, illustrated are exemplary frames where an encoder (e.g., the encoder component 208) switches between delta encoding and encoding of a high detail source (e.g., the first server-rendered video stream, the high fidelity video stream, etc.) for different regions. FIG. 5 depicts a frame 500, and FIG. 6 depicts a frame 600. The frame 500 of FIG. 5 and the frame 600 of FIG. 6 each include 20×8 macroblocks; however, frames having substantially any number of macroblocks are intended to fall within the scope of the hereto appended claims. In the illustrated examples, each of the macroblocks in the frame 500 and the frame 600 has a common size; yet, macroblocks within a frame can also have differing sizes. It is contemplated that the claimed subject matter is not limited to the examples set forth in FIGS. 5-6, and instead, such examples are provided for illustration purposes.

Turning to FIG. 5, illustrated is the frame 500, which utilizes both types of encodings, namely, delta encoding and encoding of the high detail source. Moreover, transitions between encoding types are described by metadata 502. The metadata 502 describing the encoding type can be included within a container file. In FIG. 5, the frame 500 and the metadata 502 describing the encoding regions have a granularity of one macroblock; accordingly, switch regions in the frame 500 can have a granularity of one macroblock. Thus, the metadata 502 includes information that represents the encoding type, which can be specified for a one macroblock region.

Referring to FIG. 6, illustrated is the frame 600, which also utilizes both types of encodings. Transitions between encoding types are described by metadata 602. Again, the metadata 602 describing the encoding type can be included within a container file. In FIG. 6, the frame 600 and the metadata 602 describing the encoding regions have a granularity of 2×2 macroblocks; thus, switch regions in the frame 600 can have a granularity of 2×2 macroblocks. Accordingly, the metadata 602 includes information that represents the encoding type, which can be specified for a 2×2 macroblock region.

According to an example, switching between encoding types within a frame with a granularity larger than a single macroblock (e.g., using a granularity of 2×2 macroblocks, etc.) can provide enhanced compression over switching at a level of one macroblock. However, as shown in FIG. 6, a high macroblock (e.g., a macroblock encoded using the high detail source) is a miss when it could have benefited from being encoded using delta encoding, but instead it is encoded utilizing the high detail source due to being included in a 2×2 macroblock region with other macroblocks that are encoded using the high detail source.

The frame 500 or the frame 600 can be a frame of the compressed server-manipulated video stream, which can be transmitted from the server 104 to the mobile device 102. Such frame (e.g., the frame 500, the frame 600, etc.) can include at least a first macroblock and a second macroblock. The first macroblock includes data based on a pixel-by-pixel difference between an output of the second instance 120 the application executed by the server 104 (e.g., the first server-rendered video stream, the high detail version, etc.) and an output of the third instance 204 of the application executed by the server 104 (e.g., the second server-rendered video stream, the low detail version, etc.). The second macroblock comprises data based on the output of the second instance 120 of the application executed by the server (e.g., the first server-rendered video stream, the high detail version, etc.); the second macroblock is not based on the output of the third instance 204 of the application (e.g., the second server-rendered video stream, the low detail version, etc.).

Thus, for regions of the frame where similarities between the high detail frame and the low detail frame are not strong, the encoder component 208 of the server 104 can utilize the original high detail source (e.g., the first server-rendered video stream) instead of the delta frame (e.g., generated based on the difference between the first server-rendered video stream and the second server-rendered video stream). Such regions can be a set of macroblocks. A macroblock can be a small squared region of pixels utilized in video encoding. In each macroblock, either the original high detail source or the deltas can be utilized. In order to signal to the encoder component 208 when the region type has changed, metadata (e.g., the metadata 502, the metadata 602) describing the encoding type for each macroblock can be included in an interleaved stream within a container file. According to an example, information about the macroblocks where the encoder component 208 can perform a switch can be included in the metadata (e.g., as shown in the metadata 502 and the metadata 602 of FIGS. 5-6); however, the claimed subject matter is not so limited. Indicating where such switching occurs can be utilized since the encoding changes can be similar in contiguous frames, thereby allowing temporal locality to compress such information, resulting in a compact representation.

According to an example, rate distortion optimization (RDO) can be utilized to decide when to switch between encoding types and determine a size of a region. RDO can be utilized in video compression when the encoder component 208 has to make decisions affecting both an amount of data used to encode a video sequence and a resulting quality. Yet, the claimed subject matter is not limited to utilization of RDO.

Figure 7:
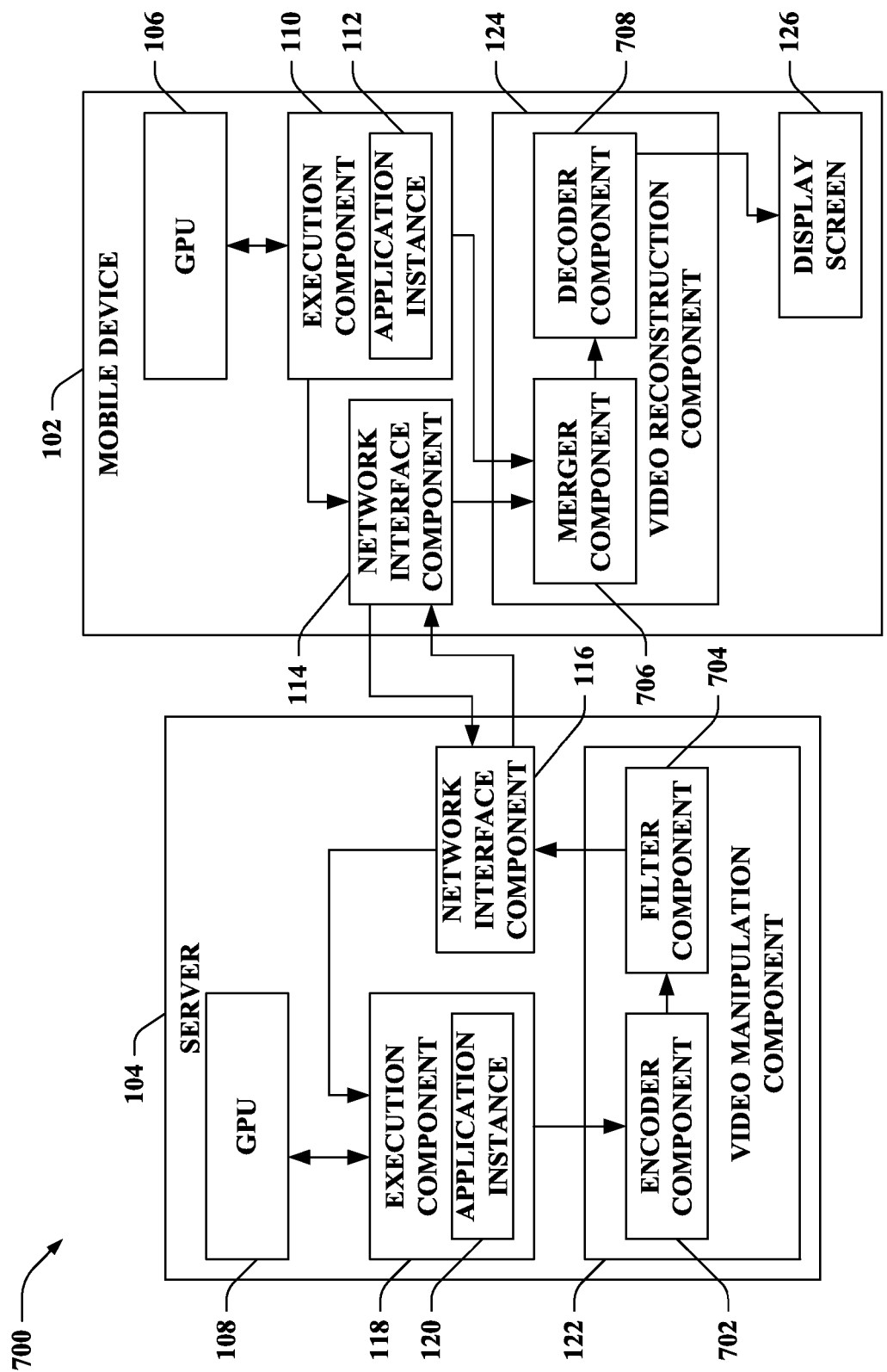
FIG. 7 illustrates a functional block diagram of an exemplary system that employs client-side I-frame rendering.

Turning to FIG. 7, illustrated is a system 700 that employs client-side I-frame rendering. The system 700 includes the mobile device 102 and the server 104. The mobile device 102 further includes the GPU 106, the execution component 110, the network interface component 114, the video reconstruction component 124, and the display screen 126. Moreover, the server 104 includes the GPU 108, the execution component 118, the video manipulation component 122, and the network interface component 116.

The execution component 110 of the mobile device 102 executes the first instance 112 of the application on the mobile device 102. Moreover, the execution component 110 causes the GPU 106 of the mobile device 102 to generate the mobile-rendered video stream based on the first instance 112 of the application. The mobile-rendered video stream has the first level of a quality attribute. In the example set forth in FIG. 7, the quality attribute can be a frame rate. When the quality attribute is the frame rate as described in FIG. 7, the first level of the level of the frame rate (e.g., the first level of the quality attribute) is lower than the second level of the frame rate (e.g., the second level of the quality attribute).

Moreover, the execution component 118 of the server 104 can execute the second instance 120 of the application on the server 104. The execution component 118 can further cause the GPU 108 of the server 104 to generate the server-rendered video stream based on the second instance 120 of the application. The server-rendered video stream can have the second level of the quality attribute (e.g., the second level of the frame rate); thus, the server-rendered video stream can have a higher frame rate than the mobile-rendered video stream. Moreover, the video manipulation component 122 can reduce the amount of information in the server-rendered video stream to generate the compressed server-manipulated video stream, which can thereafter be transmitted to the mobile device 102 by the network interface component 116.

More particularly, the video manipulation component 122 of the server 104 can further include an encoder component 702 and a filter component 704. The encoder component 702 can be substantially similar to the encoder component 208 of FIG. 2. The encoder component 702 can encode the server-rendered video stream to form an encoded sequence of frames. The encoded sequence of frames includes reference frames (I-frames) and predictive frames (P-frames). The filter component 704 can discard the reference frames from the encoded sequence of frames to generate the compressed server-manipulated video stream. Accordingly, the compressed server-manipulated video stream can be a sequence of frames that comprises predictive frames along with markers that indicate where reference frames belong. Further, such sequence of frames of the compressed server-manipulated video stream can lack the reference frames.

The video reconstruction component 124 of the mobile device 102 can further include a merger component 706 and a decoder component 708. The merger component 706 can insert frames of the mobile-rendered video stream into the sequence of frames that comprises the predictive frames (e.g., the compressed server-manipulated video stream) to form a merged sequence of frames. Accordingly, in the merged sequence of frames, the frames of the mobile-rendered video stream are reference frames (I-frames), and the frames of the compressed server-manipulated video stream are predictive frames (P-frames). Further, the decoder component 708 can decode the merged sequence of frames to form the collaborative video stream, which can thereafter be displayed on the display screen 126. The collaborative video stream can have the second level of the quality attribute.

As set forth above, the mobile-rendered video stream can have the first level of the quality attribute and the collaborative video stream can have the second level of the quality attribute. In the example set forth in FIG. 7, the quality attribute can be a frame rate. Moreover, the first level of the frame rate can be lower than the second level of the frame rate. Accordingly, the frame rate of the mobile-rendered video stream can be lower than a frame rate of the collaborative video stream generated by the video reconstruction component 124.

The system 700 employs client-side I-frame rendering. For such technique, the mobile device 102 can generate a high detail version of an output of the application (e.g., the mobile-rendered video stream), but at a reduced frame rate (e.g., the first level of the quality attribute which can be lower than the second level of the quality attribute). The server 104 is employed to generate a high detail version of the game output (e.g., the server-rendered video stream); yet, the GPU 108 of the server 104 can produce such output at a higher frame rate as compared to the GPU 106 of the mobile device 102.

Various examples set forth below pertain to the system 700 utilizing H.264 compression. Thus, the encoder component 702 can be an H.264 encoder, and the decoder component 708 can be an H.264 decoder. It is to be appreciated, however, that other types of video compression in addition to or instead of H.264 are intended to fall within the scope of the hereto appended claims.

The server 104 can generate an H.264 compressed video of the game output utilizing the encoder component 702. Moreover, the filter component 704 can discard the I-frames from such video before sending such video (e.g., the compressed server-manipulated video stream) over the network to the mobile device 102. The mobile device 102 receives the compressed video that includes the P-frames without the I-frames, and utilizes the frames rendered by the GPU 106 of the mobile device 102 to merge the missing I-frames back into the H.264 video stream utilizing the merger component 706. Further, the decoder component 708 of the mobile device 102 can decode such video stream, which can thereafter be caused to be displayed on the display screen 126. Thus, similar to delta encoding, graphical output that is similar to the high detail full frame rate version rendered by the GPU 108 of the server 104 can result from the video reconstruction component 124.

For client-side I-frame rendering, the GPU 106 of the mobile device 102 can render high detail frames at a low frame rates, and the GPU 108 of the server 104 can render a high detail frames at a full frame rate. The server 104 sends a compressed video with P-frames, and the mobile device 102 inserts its rendered frames into the compressed video as I-frames. According to an example, the GPU 106 of the mobile device 102 can generate at least six frames per second of high detail output when employing client-side I-frame rendering, which can be combined with the P-frames from the server 104 at the higher frame rate to provide sixty frames per second of high detail output. Such higher frame rate can mitigate negative impact on user experience when executing a game. Yet, it is to be appreciated that the claimed subject matter is not so limited.

As was the case with delta encoding described above, quantization of H.264 can have an effect on client-side I-frame rendering. As the level of quantization increases, an encoded frame can become less similar to its original source. As a result, P-frames based on compressed reference frames have to encode more information to make up for this loss. Thus, the P-frames convey both the changes of the current frame and make up for losses from previous compressed frames.

If the encoder component 702 is configured to output a stream of a given size, then frames may be encoded using heavier compression with greater information loss. Information loss can accumulate across frames until another I-frame arrives in the sequence. This loss accumulation phenomenon is similar to temporal error propagation, in which frames dropped from a streaming video affect contiguous frames in the sequence. Due to this phenomenon, having I-frames appear more frequently in the sequence can lead to higher quality P-frames under the same level of quantization. Yet, P-frames can have a better compression rate than I-frames, and increasing the frequency of I-frames can increase the overall size of the encoded video stream.

Client-side I-frame rendering can rely on the GPU 106 of the mobile device 102 to render high detail frames at a low frame rates. The server 104 can be responsible for supplementing the missing frames, which can be utilized to create a smooth scene (e.g., between 30 and 60 frames per second). The server 104 can render high detail frames in the sequence, and the encoder component 702 can encode frames that the client will also render as I-frames. However, prior to sending the final stream over the network, the filter component 704 can remove the I-frames that will be rendered by the mobile device 102. As a result, the encoder component 702 of the server 104 can generate high quality P-frames using less information. Accordingly, the size of the video transfer can be reduced by a factor proportional to the number of frames rendered by the GPU 106 of the mobile device 102. Moreover, the size of each transferred P-frame can be reduced.

I-frames rendered by the mobile device 102 need not be quantized. Thus, P-frames that refer to the I-frames rendered by the GPU 106 of the mobile device 102 can be encoded using fewer bits, which can lead to enhanced image quality for a given bit rate. However, according to an example, the frames rendered by the GPU 106 of the mobile device 102 can be quantized to mitigate visual effects due to switching between I-frames that are not quantized and P-frames that are quantized. According to another example, switching between non-quantized I-frames and quantized P-frames can be performed at irregular intervals to make the switching effect less visually apparent.

By way of another example, it is also possible to achieve a desired frame rate at the expense of a moderate reduction in quality by decreasing the game settings used to render the high detail version of the game. Doing so may allow the mobile device 102 to render I-frames at a higher rate.

Reference is now made to FIGS. 2 and 7. It is contemplated that delta encoding and client-side I-frame rendering can be performed in combination. Accordingly, the compressed server-manipulated video stream sent from the server 104 and received by the mobile device 102 can include reference frames and predictive frames. The reference frames can be delta frames that represent a pixel-by-pixel difference between corresponding frames of the first server-rendered video stream and the second server-rendered video stream (e.g., generated via delta encoding). Moreover, the predictive frames can be based on frames of the first server-rendered video stream (e.g., generated via client-side I-frame rendering).

Hence, client side I-frame rendering can be combined with delta encoding. According to an example, the mobile device 102 can render frames with a quality level that allows for meeting delay requirements. This graphical setting can be similar to the high detail version generated by the server 104, resulting in small deltas. These deltas can be encoded in high quality with minimal or no quantization and placed in the stream sent from the server 104 instead of the discarded I-frames.

Using deltas to patch the I-frames produced at the client can have various consequences. For instance, the transfer size can be larger proportionally to the graphical difference between the high detail and the device high detail versions of the game. Further, because of the small data loss present at the I-frames, the P-frames can present a small degree of temporal error propagation, which potentially can impact quality and lead to higher bit-rates to achieve a substantially similar quality level that would be obtained if no deltas were used.

By way of another example, compensation for rendering delay at the mobile device 102 can include rendering frames at the mobile device 102 ahead of time. This approach can be based on the concepts of frame skipping and variable frame rate. Accordingly, the mobile device 102 can be caused to render future frames by making it believe more time has passed since the last frame was rendered. In other words, after user input has been received, system time calls can be intercepted and modified to report a future time, reducing the delay to produce the next I-frame that reflects the user input.

By way of further example, it is possible to combine foregoing examples or to compromise quality by decreasing the quality of the high detail settings, allowing either the mobile device 102 to render its share of frames faster and reduce the size of the deltas if also using delta encoding.

It is also contemplated that optimizations can be provided by using low level hardware video encoders (e.g., the encoder component 208, the encoder component 702, etc.) and video decoders (e.g., the decoder component 210, the decoder component 708, etc.). Many of the examples set forth above assumed a simple black box video decoder that takes a standard H.264 video stream and outputs decoded frames. For that reason, the discussion above pertains to a standard stream being reconstructed in the device. However, more sophisticated video decoders can provide a lower level API that allows developers to separately perform common operations found in video decoding such as inverse discrete cosine transform, motion compensation and inverse quantization. If such a hardware decoder is employed, then non-standard streams can be used and protocols that are similar but not identical to H.264 can be derived.

Having a lower level decoder can allow incorporation of information that may otherwise be sent as a separate channel, such as the switching region information in a hybrid delta encoding scheme or extra information such as the least significant bit lost in equation 1. Also, a customizable decoder can allow for block by block motion prediction found in H.264.

As discussed above for delta encoding, information originating in the low detail frame can include information that can be used to reduce the amount of information that has to be transferred from the server 104 to the mobile device 102. It addition to using deltas, it may also be possible to encode in the stream both the high detail and low detail frames and use both as references. Following this example, the high detail frames can be displayed. In such a stream, the encoder can decide for each macroblock which frame can be used as reference to achieve enhanced compression. For example, new objects appearing in the sequence can be more likely to be found in the low detail version of the current frame than in the high detail of the previous one. Such a stream may be appropriately handled by a decoder that exposes a lower level API.

Moreover, hardware encoding support in the mobile device 102 can further reduce the size of the compressed server-manipulated video stream sent from the server 104 by computing motion predictions locally. Motion prediction is the step in video compression that takes advantage of temporal locality, and is an expensive operation that can use a fast processor or dedicated hardware in order to be done in real time.

The output of motion prediction includes a set of motion vectors, macroblock metadata and extra image information used to regenerate the encoded bitmaps called the residual. Since motion information in the low detail version is similar to that found in the high detail version, it may be possible to reduce the information to be sent, especially at lower bitrates, by using the low detail motion information to encode the high detail version and re-compute the motion information in the mobile device 102 instead of obtaining it from the server 104.

Figure 8:
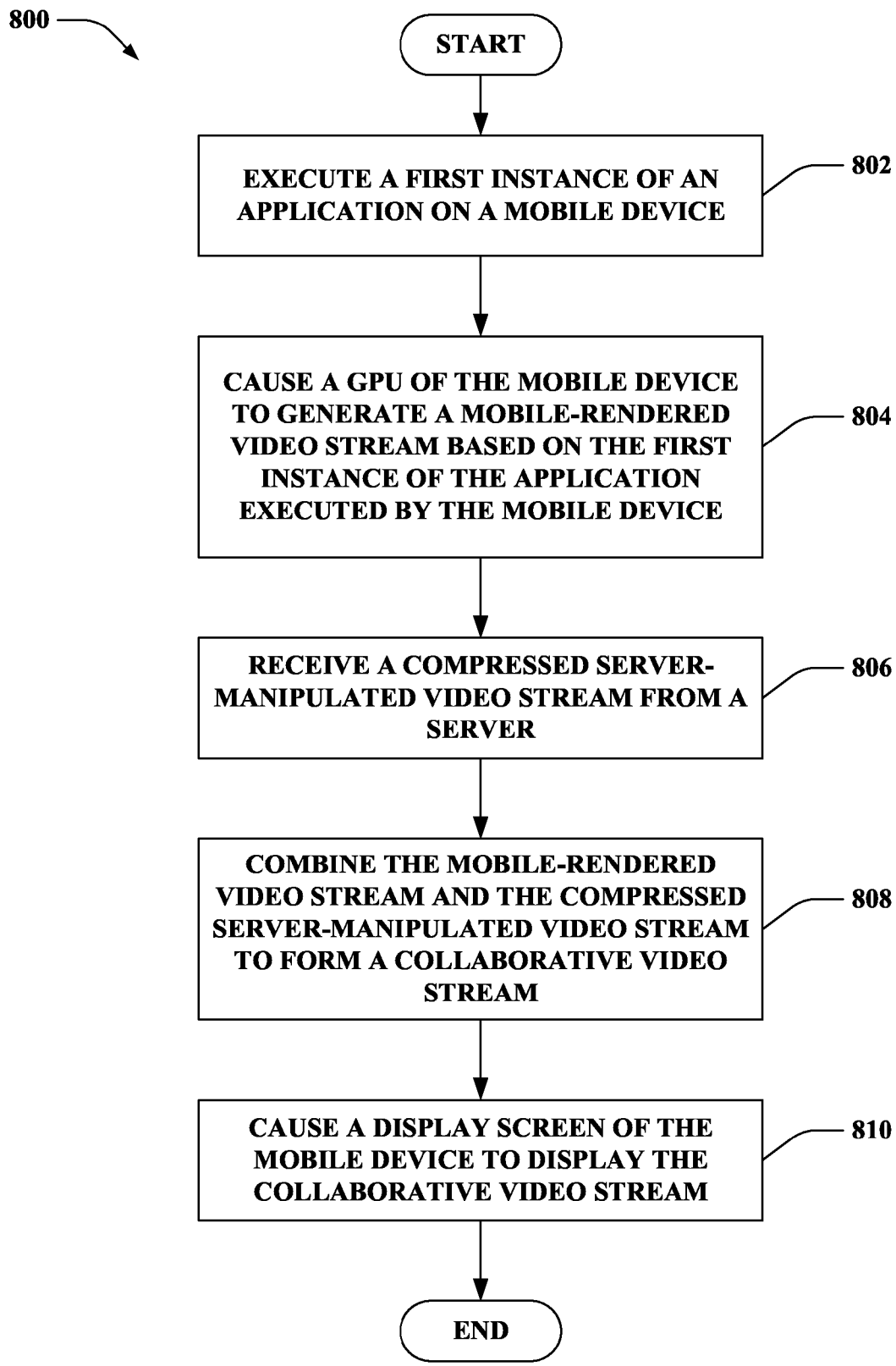
FIG. 8 is a flow diagram that illustrates an exemplary methodology of using collaborative rendering to create a video for display on a display screen of a mobile device.
Figure 9:
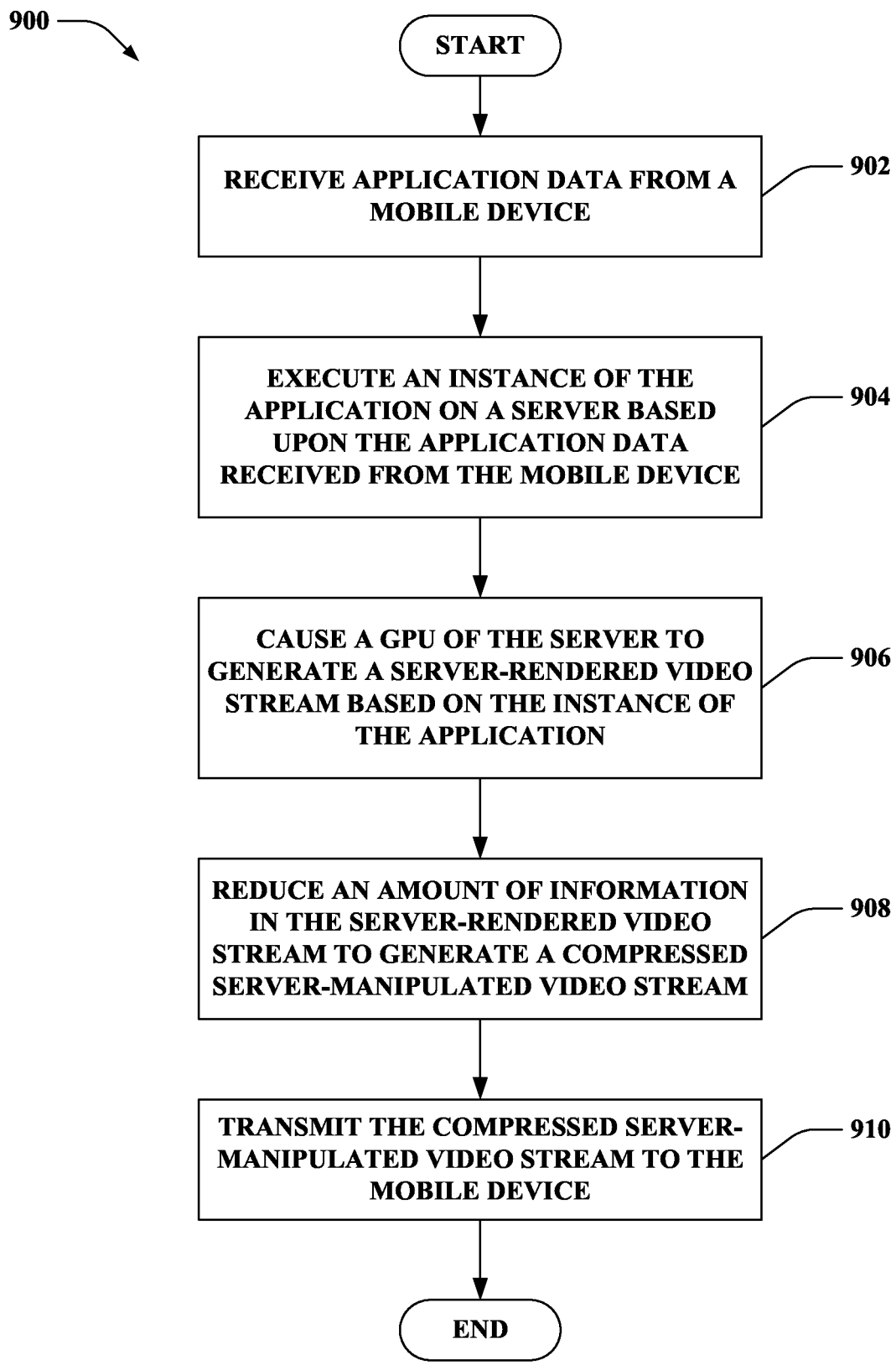
FIG. 9 is a flow diagram that illustrates an exemplary methodology of employing a GPU of a server to assist video rendering on a mobile device.

FIGS. 8-9 illustrate exemplary methodologies relating to performing collaborate rendering. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 of using collaborative rendering to create a video for display on a display screen of a mobile device. At 802, a first instance of an application can be executed on the mobile device. At 804, a GPU of the mobile device can be caused to generate a mobile-rendered video stream based on the first instance of the application executed by the mobile device. For instance, the mobile-rendered video stream can have a first level of a quality attribute. At 806, a compressed server-manipulated video stream can be received from a server. The compressed server-manipulated video stream can be generated by the server based at least in part upon a second instance of the application executed by the server. According to various embodiments, the compressed server-manipulated video stream can also be generated by the server based at least in part upon a third instance of the application executed by the server; yet, the claimed subject matter is not so limited.

At 808, the mobile-rendered video stream and the compressed server-manipulated video stream can be combined to form a collaborative video stream. The collaborative video stream can have a second level of the quality attribute. Moreover, the second level of the quality attribute is greater than the first level of the quality attribute. At 810, a display screen of the mobile device can be caused to display the collaborative video stream.

With reference to FIG. 9, illustrated is a methodology 900 of employing a GPU of a server to assist video rendering on a mobile device. At 902, application data can be received from the mobile device. At 904, an instance of the application can be executed on the server based upon the application data received from the mobile device. At 906, a GPU of the server can be caused to generate a server-rendered video stream based on the instance of the application. The server-rendered video stream can have a second level of the quality attribute. At 908, an amount of information in the server-rendered video stream can be reduced to generate a compressed server-manipulated video stream. At 910, the compressed server-manipulated video stream can be transmitted to the mobile device. The compressed server-manipulated video stream can be combinable with a mobile-rendered video stream generated by a GPU of the mobile device based on an instance of the application executed by the mobile device. Moreover, the mobile-rendered video stream can have a first level of the quality attribute, where the second level of the quality attribute is greater than the first level of the quality attribute.

Figure 10:
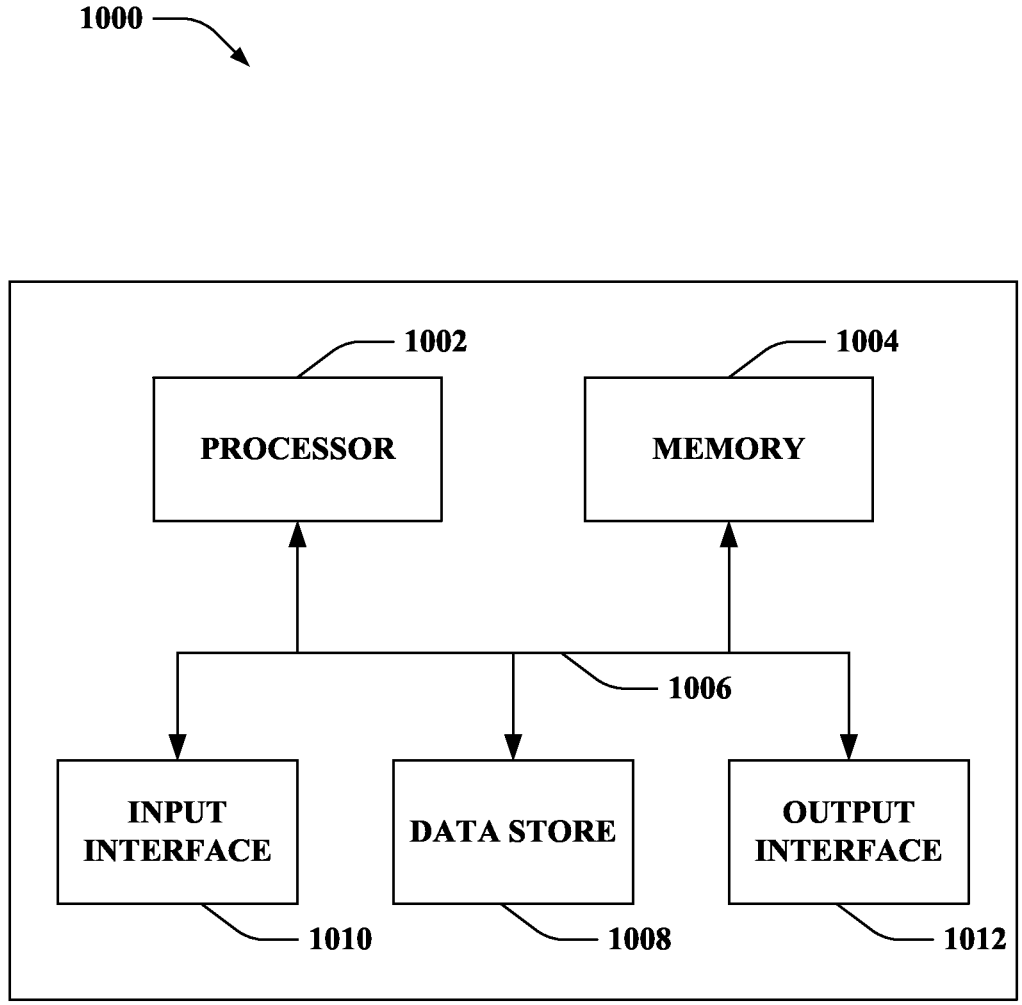
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be the mobile device 102 or the server 104 described herein. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store application data, video stream(s), and so forth.

The computing device 1000 additionally includes a data store 1008 that is accessible by the processor 1002 by way of the system bus 1006. The data store 1008 may include executable instructions, application data, video stream(s), etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012. According to an example where the computing device 1000 is the mobile device 102, the computing device 1000 can further include a display screen (e.g., the display screen 126 which may be a touchscreen, etc.).

It is contemplated that the external devices that communicate with the computing device 1000 via the input interface 1010 and the output interface 1012 and/or the display screen of the computing device 1000 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of rendering video for display on a display screen of a mobile device, comprising:
   executing a first instance of an application on the mobile device;
   causing a graphics processing unit (GPU) of the mobile device to generate a mobile-rendered video stream based on the first instance of the application executed by the mobile device, wherein the mobile-rendered video stream has a first level of a quality attribute;
   receiving a compressed server-manipulated video stream from a server, wherein the compressed server-manipulated video stream is generated based at least in part upon a second instance of the application executed by the server, and wherein the compressed server-manipulated video stream is received during execution of the first instance of the application while the mobile-rendered video stream is generated;
   combining the mobile-rendered video stream and the compressed server-manipulated video stream to form a collaborative video stream, wherein the collaborative video stream has a second level of the quality attribute, and wherein the second level of the quality attribute is greater than the first level of the quality attribute; and
   causing the display screen of the mobile device to display the collaborative video stream.

2. The method of claim 1, wherein the compressed server-manipulated video stream received from the server comprises delta frames, wherein a delta frame represents a pixel-by-pixel difference, the pixel-by-pixel difference being between a frame of a first server-rendered video stream and a corresponding frame of a second server-rendered video stream, wherein the first server-rendered video stream is generated based on the second instance of the application executed by the server and the second server-rendered video stream is generated based on a third instance of the application executed by the server, and wherein the first server-rendered video stream has the second level of the quality attribute and the second server-rendered video stream has the first level of the quality attribute.

3. The method of claim 2, wherein the quality attribute is visual detail defined by a set of enabled visual effects of the application, and wherein fewer visual effects are enabled for the first level of the visual detail as compared to the second level of the visual detail.

4. The method of claim 1, wherein combining the mobile-rendered video stream and the compressed server-manipulated video stream to form the collaborative video stream further comprises:
   decoding the compressed server-manipulated video stream received from the server to output decoded delta frames; and
   applying the decoded delta frames to respective corresponding frames of the mobile-rendered video stream to form the collaborative video stream.

5. The method of claim 4, further comprising performing a transformation upon the decoded delta frames, wherein the decoded delta frames as transformed are applied to the respective corresponding frames of the mobile-rendered video stream to form the collaborative video stream.

6. The method of claim 1, wherein a frame of the compressed server-manipulated video stream received from the server comprises at least a first macroblock and a second macroblock, wherein the first macroblock comprises data based on a pixel-by-pixel difference, the pixel-by-pixel difference being between an output of the second instance of the application executed by the server and an output of a third instance of the application executed by the server, wherein the second macroblock comprises data based on the output of the second instance of the application executed by the server without being based on the output of the third instance of the application executed by the server, and wherein the output of the second instance of the application executed by the server has the second level of the quality attribute and the output of the third instance of the application executed by the server has the first level of the quality attribute.

7. The method of claim 1, wherein the compressed server-manipulated video stream received from the server is a sequence of frames that comprises predictive frames along with markers where reference frames belong, and wherein the sequence of frames lacks the reference frames.

8. The method of claim 7, wherein combining the mobile-rendered video stream and the compressed server-manipulated video stream to form the collaborative video stream further comprises:
   inserting frames of the mobile-rendered video stream into the sequence of frames that comprises the predictive frames to form a merged sequence of frames, wherein the frames of the mobile-rendered video stream are reference frames; and
   decoding the merged sequence of frames to form the collaborative video stream.

9. The method of claim 7, wherein the quality attribute is a frame rate, and wherein the first level of the frame rate is lower than the second level of the frame rate.

10. The method of claim 1, wherein the application is an electronic game.

11. The method of claim 1, further comprising synchronizing execution of the first instance of the application by the mobile device with execution of at least the second instance of the application by the server.

12. The method of claim 1, further comprising displaying the mobile-rendered video stream on the display screen of the mobile device when the mobile device is disconnected from the server.

13. The method of claim 1, wherein the compressed server-manipulated video stream received from the server comprises reference frames and predictive frames, wherein the reference frames are delta frames that represent a pixel-by-pixel difference between corresponding frames of a first server-rendered video stream and a second server-rendered video stream, wherein the predictive frames are based on the frames of the first server-rendered video stream, wherein the first server-rendered video stream is generated based on the second instance of the application executed by the server and the second server-rendered video stream is generated based on a third instance of the application executed by the server, and wherein the first server-rendered video stream has the second level of the quality attribute and the second server-rendered video stream has the first level of the quality attribute.

14. A system that employs a graphics processing unit (GPU) of a server to assist video rendering on a mobile device, comprising:
   a network interface component that receives application data from the mobile device, wherein the application data pertains to execution of a first instance of an application on the mobile device;

an execution component that executes a second instance of the application on the server based upon the application data received from the mobile device, wherein the execution component further causes the GPU of the server to generate a first server-rendered video stream based on the second instance of the application, wherein the first server-rendered video stream has a second level of a quality attribute, and wherein execution of the second instance of the application on the server is synchronized with the execution of the first instance of the application on the mobile device; and a video manipulation component that reduces an amount of information in the first server-rendered video stream to generate a compressed server-manipulated video stream;

wherein the network interface component transmits the compressed server-manipulated video stream to the mobile device, wherein the compressed server-manipulated video stream is combinable with a mobile-rendered video stream generated by a GPU of the mobile device based on the first instance of the application, wherein the mobile-rendered video stream has a first level of the quality attribute, and wherein the second level of the quality attribute is greater than the first level of the quality attribute.

15. The system of claim 14, further comprising:

a second execution component that executes a third instance of the application on the server based upon the application data received from the mobile device, wherein the second execution component further causes the GPU of the server to render a second server-rendered video stream based on the third instance of the application, wherein execution of the third instance of the application on the server is synchronized with execution of the first instance of the application on the mobile device, wherein the second server-rendered video stream has the first level of the quality attribute, wherein the quality attribute is visual detail defined by a set of enabled visual effects of the application, and wherein fewer visual effects are enabled for the first level of the visual detail as compared to the second level of the visual detail; and wherein the video manipulation component further comprises:

a comparison component that computes pixel-by-pixel differences between corresponding frames of the first server-rendered video stream and the second server-rendered video stream to generate a sequence of delta frames, a delta frame represents a pixel-by-pixel difference between a frame of the first server-rendered video stream and a corresponding frame of the second server-rendered video stream; and an encoder component that encodes the sequence of the delta frames to generate the compressed server-manipulated video stream.

16. The system of claim 15, wherein the video manipulation component further comprises a transformation component that applies a transformation to the delta frames in the sequence, and wherein the sequence of the delta frames as transformed by the transformation component are encoded by the encoder component to generate the compressed server-manipulated video stream.

17. The system of claim 14, wherein the video manipulation component further comprises:

an encoder component that encodes the first server-rendered video stream to form an encoded sequence of frames, wherein the encoded sequence of frames comprises reference frames and predictive frames; and a filter component that discards the reference frames from the encoded sequence of frames to generate the compressed server-manipulated video stream.

18. The system of claim 17, wherein the quality attribute is a frame rate, and wherein the first level of the frame rate is lower than the second level of the frame rate.

19. The system of claim 14, further comprising:

a second execution component that executes a third instance of the application on the server based upon the application data received from the mobile device, wherein the second execution component further causes the GPU of the server to render a second server-rendered video stream based on the third instance of the application, wherein execution of the third instance of the application on the server in synchronized with execution of the first instance of the application ob the mobile device, and wherein the second server-rendered video stream has the first level of the quality attribute; and wherein the compressed server-manipulated video stream generated by the video manipulation component comprises reference frames and predictive frames, wherein the reference frames are delta frames that represent a pixel-by-pixel difference between corresponding frames of the first server-rendered video stream and the second server-rendered video stream, and wherein the predictive frames are based on the frames of the first server-rendered video stream.

20. A mobile device, comprising:

a graphics processing unit (GPU);

an execution component that executes a first instance of an application on the mobile device, wherein the execution component further causes the GPU to generate a mobile-rendered video stream based on the first instance of the application, wherein the mobile-rendered video stream has a first level of a quality attribute;

a network interface component that transmits application data that pertains to execution of the first instance of the application to a server, wherein the network interface component further receives a compressed server-manipulated video stream from the server, wherein the compressed server-manipulated video stream is generated based at least in part upon a second instance of the application executed by the server responsive to the application data, and wherein execution of the second instance of the application that generates the compressed server-manipulated video stream on the server is synchronized with execution of the first instance of the application that generates the mobile-rendered video stream on the mobile device;

a video reconstruction component that combines the mobile-rendered video stream and the compressed server-manipulated video stream to form a collaborative video stream, wherein the collaborative video stream has a second level of the quality attribute, and wherein the second level of the quality attribute is greater than the first level of the quality attribute; and a display screen that displays the collaborative video stream.

* * * * *